United States Patent [19]

Dannar

[11] Patent Number: 5,775,075
[45] Date of Patent: Jul. 7, 1998

[54] ARTICULATED BOOM ASSEMBLY

[76] Inventor: Gary D. Dannar, 678 Valleywood Dr. SE., Salem, Oreg. 97306

[21] Appl. No.: 719,400

[22] Filed: Sep. 24, 1996

[51] Int. Cl.$^6$ .............................. A01D 34/00; A01D 34/86
[52] U.S. Cl. ........................ 56/15.2; 56/15.9; 56/DIG. 14
[58] Field of Search ................................ 56/15.1, 15.2, 56/15.5, 15.6, 15.9, 231, DIG. 14; 414/687, 688, 694, 695.8, 722, 744.2, 744.5

[56] References Cited

U.S. PATENT DOCUMENTS

| | | | |
|---|---|---|---|
| 3,665,685 | 5/1972 | Allard | 56/10.4 |
| 3,949,539 | 4/1976 | Cartner | 56/10.4 |
| 4,049,139 | 9/1977 | Stedman | 414/694 |
| 4,257,731 | 3/1981 | Beaver | 414/694 |
| 4,274,796 | 6/1981 | Phillips | 414/694 X |
| 4,274,797 | 6/1981 | Coon | 414/694 |
| 4,426,829 | 1/1984 | Johnson | 56/15.5 |
| 4,887,417 | 12/1989 | Parsons, Jr. | 56/15.2 |
| 4,901,508 | 2/1990 | Whatley | 56/10.4 |
| 4,950,127 | 8/1990 | Weyer | 414/694 |
| 4,956,965 | 9/1990 | Parsons, Jr. | 56/15.1 |
| 4,996,830 | 3/1991 | Davison | 56/15.5 X |
| 5,210,997 | 5/1993 | Mountcastle, Jr. | 56/15.2 |
| 5,341,629 | 8/1994 | Penner | 56/15.2 |
| 5,396,754 | 3/1995 | Fraley | 56/15.2 |
| 5,625,967 | 5/1997 | Kulle | 414/694 X |

OTHER PUBLICATIONS

Brochure for Beaver P10 Flail Cutter, Polymark Beaver Equipment Ltd. (No date).

*Primary Examiner*—John A. Ricci

[57] ABSTRACT

A brush cutting apparatus is mounted on an articulated boom assembly wherein the second boom member carries a pivot axis oriented orthogonally to the pivotal connections of the first and second boom members allowing generally vertical movement of the boom assembly. The articulated boom assembly preferably mounts a brush cutting head at the distal end of the second boom member to provide a greater range of flexibility and versatility in the operation of the brush cutting head. The orthogonal pivot axis is defined by a hydraulic rotary actuator carried in the central portion of the second boom member and enables the brush cutting head to be moved through an arcuate path generally parallel to the orientation of the second boom member as defined through a pivotal movement of the second boom member relative to the first boom member. The arcuate scything motion allows the cutting head to cover a greater range of ground for each pass of the prime mover while staying generally parallel to the surface of the ground. Furthermore, the hydraulic rotary actuator is operable to provide a bidirectional breakaway mechanism that is operable irrespective of which side of the prime mover the cutting head is operated.

20 Claims, 9 Drawing Sheets

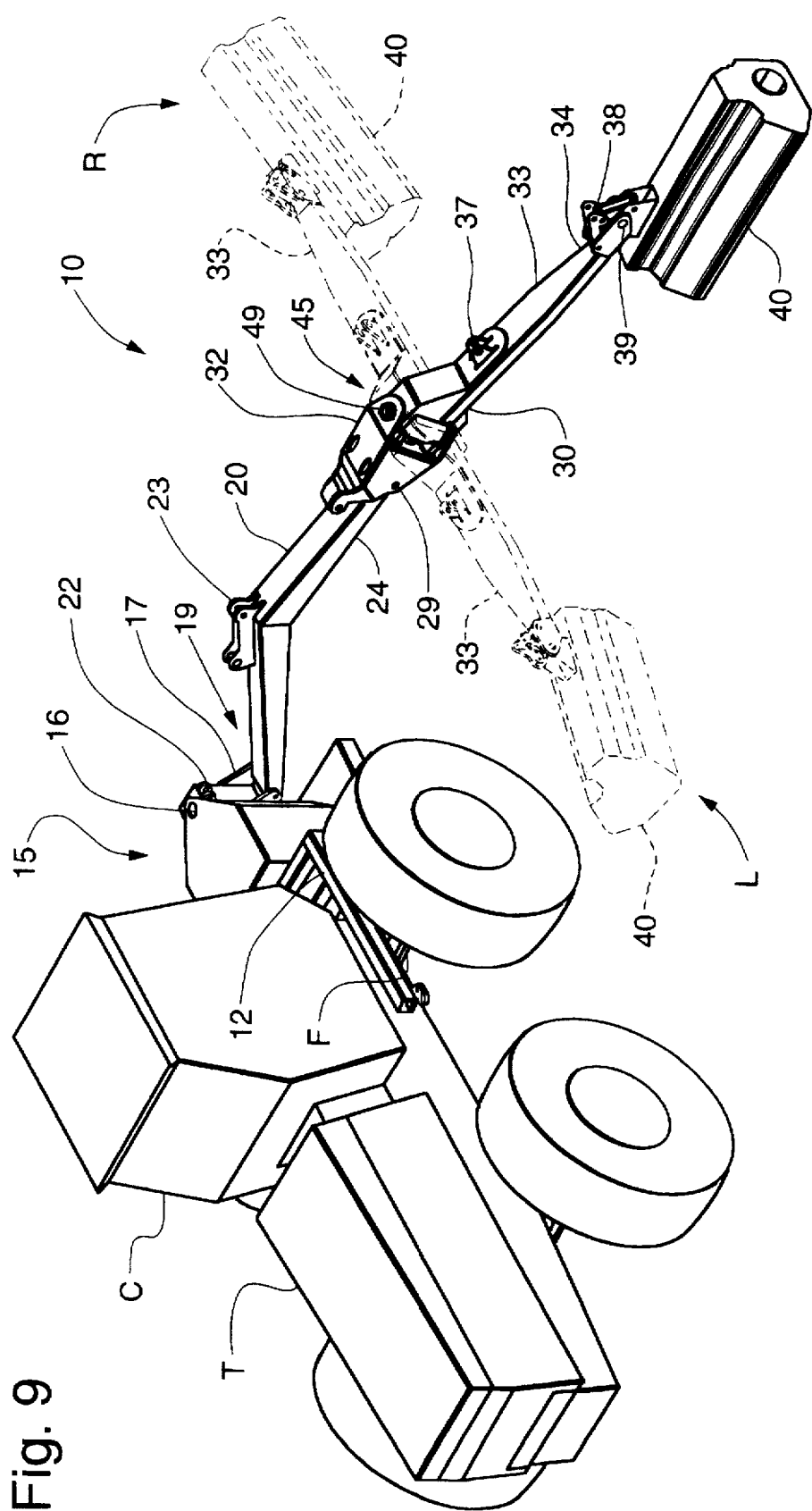

ARTICULATED BOOM ASSEMBLY

BACKGROUND OF THE INVENTION

This invention relates generally to an apparatus that is extensible from a prime mover to locate a working implement in variable orientations away from the prime mover and, more particularly, to an articulated boom apparatus to provide a greater range of pivotal movements for the working implement.

In mowing devices commonly referred to as mounted brush cutters, or in some cases highway mowers, the cutting head is attached to the end of a boom apparatus that is pivotally supported from a prime mover about a generally vertical axis to provide a first degree of horizontal motion over a range of typically about 100 to 120 degrees about the vertical pivot axis. This first range of motion is usually limited by the structure of the prime mover. The boom apparatus is typically pivoted at the prime mover support structure about a generally horizontal pivot axis to provide a second range of vertical motion for the cutting head relative to the prime mover.

The boom apparatus will typically carry a second generally horizontal pivot axis oriented substantially parallel to the first horizontal pivot axis and located in the middle of the boom apparatus to provide a third range of vertical motion about a different pivot center than the second range of vertical motion. This boom structure is provided by mounting a first boom member to the first horizontal pivot and by mounting a second boom member to the first boom member by the second horizontal pivot axis such that the second boom member is pivotally movable relative to the first boom member.

Customarily, the second boom member will have the cutting head pivotally mounted at the distal end of the second boom member, usually through a third generally horizontal pivot axis oriented generally parallel to the first and second horizontal pivot axes. The cutting head is then pivotal relative to the second boom member to permit an orientation thereof through a fourth range of motion to allow the cutting head to follow the contours of the ground as closely as possible. The movements of each of the respective components of the known boom apparatus configuration are usually controlled by the manipulation of hydraulic cylinders interconnecting the components being pivotally moved relative to the other.

Accordingly, known prior art brush cutting devices are selectively movable from side-to-side relative to the prime mover and operable to the side of the prime mover where the operator can observe the operation of the cutting head. The vertical attitude of the cutting head is normally a function of the movement of the boom apparatus about the first pivot axis, while the distance the cutting head is operated away from the prime mover is generally a function of the pivotal movement of the second boom member relative to the first boom member about the second horizontal pivot; however, in reality the combination of the movements of the boom apparatus about both the first and second horizontal pivots controls both the vertical attitude of the cutting head and the distance the cutting head is operated away from the prime mover. As previously noted, the pivotal movement of the cutting head relative to the second boom member controls the attitude and orientation of the cutting head relative to the ground.

It would be desirable to provide an improved boom apparatus that will enable a working implement to be afforded a greater range of movement relative to the prime mover. The more flexibility the apparatus would have in orientation of operations, the greater value the brush cutting apparatus will have to the operator. One skilled in the art will readily recognize that the instant invention is not limited to cutting heads, but can be applicable in such matters to a plurality of different work implement configurations.

SUMMARY OF THE INVENTION

It is an object of this invention to overcome the aforementioned disadvantages of the prior art by providing an articulated boom apparatus that provides a greater range of motion.

It is a feature of this invention to mount a cutting head to the distal end of the articulated boom assembly to provide a brush cutting apparatus with a greater range of motion.

It is an advantage of this invention that the cutting head has a greater flexibility in use.

It is another feature of this invention that cutting head can be positioned in orientations heretofore unknown in the art.

It is another object of this invention to provide an articulated boom assembly that carries an orthogonal pivot axis of movement for the mechanism mounted on the distal end of the boom assembly.

It is still another feature of this invention that the second boom member is provided with a hydraulic rotary actuator between the pivotal mounting of the second boom member to the first boom member and the pivotal mounting of the apparatus at the distal end of the second boom member.

It another advantage of this invention that the hydraulic rotary actuator can be manipulated to effect movement of the implement attached to the distal end of the boom apparatus within a plane that passes through the pivot axis pivotally mounting the second boom member to the first boom member.

It is yet another feature of this invention that the hydraulic rotary actuator defines a pivot axis for movement of the boom assembly that is substantially perpendicular to the pivotal mounting of the second boom member to the first boom member.

It is still another advantage of this invention that the orientation of the pivot axis defined by the hydraulic rotary actuator is variable and dependent on the relative pivoted position of the second boom member relative to the first boom member.

It is yet another advantage of this invention that the work implement mounted on the distal end of the boom assembly can be positioned into different orientations through a combination of the manipulation of the hydraulic rotary actuator and the traditional pivotal movements of a horizontally pivoted boom assembly.

It is still another object of this invention that the articulated boom apparatus can be utilized to provide a versatile and flexible brush cutting apparatus mountable on a prime mover.

It is a further advantage of this invention that the cutting head can be positioned with great versatility through appropriate manipulation of the pivot axis of the articulated boom assembly.

It is a further feature of this invention that the cutting head can be moved through a scything motion through manipulation of the hydraulic rotary actuator.

It is still a further feature of this invention that the positioning of the second boom member is a substantially horizontal orientation will permit the cutting head to cover a greater range of cutting motion through the scything action of the cutting head obtained through manipulation of the hydraulic rotary actuator.

It is yet a further feature of this invention that the articulation of the second boom member parallel to a sloped ground surface laterally of the prime mover will allow the manipulation of the hydraulic rotary actuator to effect movement of the cutting head over the sloped ground in the scything action to cover a greater area of cut in each pass of the prime mover.

It is yet another object of this invention to provide a brush cutting apparatus mountable on a prime mover to be operable on either side of the prime mover.

It is yet another feature of this invention that the hydraulic rotary actuator defining an orthogonal pivot axis within the boom assembly provides a breakaway mechanism for the work implement attached to the boom assembly irrespective of which side of the prime mover the implement is being operated.

It is still a further advantage of this invention that the work implement is provided with a breakaway mechanism operable in a bidirectional mode to protect the implement from impact damage on opposing sides of the prime mover to which the implement is mounted.

It is still a further object of this invention to provide for a brush cutting apparatus a dual mode breakaway mechanism to protect the apparatus from damage when operated on either side of the prime mover on which the brush cutting apparatus is mounted.

It is yet another object of this invention to provide an articulated boom assembly incorporating an orthogonal pivot axis to provide a brush cutting device which is durable in construction, inexpensive of manufacture, carefree of maintenance, facile in assemblage, and simple and effective in use.

These and other objects, features and advantages are accomplished according to the instant invention by providing an articulated boom assembly wherein the second boom member carries a pivot axis oriented orthogonally to the pivotal connections of the first and second boom members allowing generally vertical movement of the boom assembly. The articulated boom assembly preferably mounts a cutting head at the distal end of the second boom member to provide a brush cutting apparatus having a greater range of flexibility and versatility. The orthogonal pivot axis is provided by a hydraulic rotary actuator carried in the central portion of the second boom member and enables the cutting head to be moved through an arcuate path generally parallel to the orientation of the second boom member as defined through a pivotal movement of the second boom member relative to the first boom member. This arcuate scything motion allows the cutting head to cover a greater range of ground for each pass of the prime mover while staying generally parallel to the surface of the ground. Furthermore, the hydraulic rotary actuator is operable to provide a bidirectional breakaway mechanism that is operable irrespective of which side of the prime mover the cutting head is operated.

BRIEF DESCRIPTION OF THE DRAWINGS

The advantages of this invention will be apparent upon consideration of the following detailed disclosure of the invention, especially when taken in conjunction with the accompanying drawings wherein:

FIG. 9 is a perspective view of a prime mover as shown in FIG. 7, but with the boom apparatus extended substantially fully laterally of the prime mover such that the second boom member is substantially horizontal, the range of motion available through manipulation of the hydraulic rotary actuator being shown in phantom.

DETAILED DESCRIPTION OF THE PREFERRED EMBODIMENT

Figure 1:
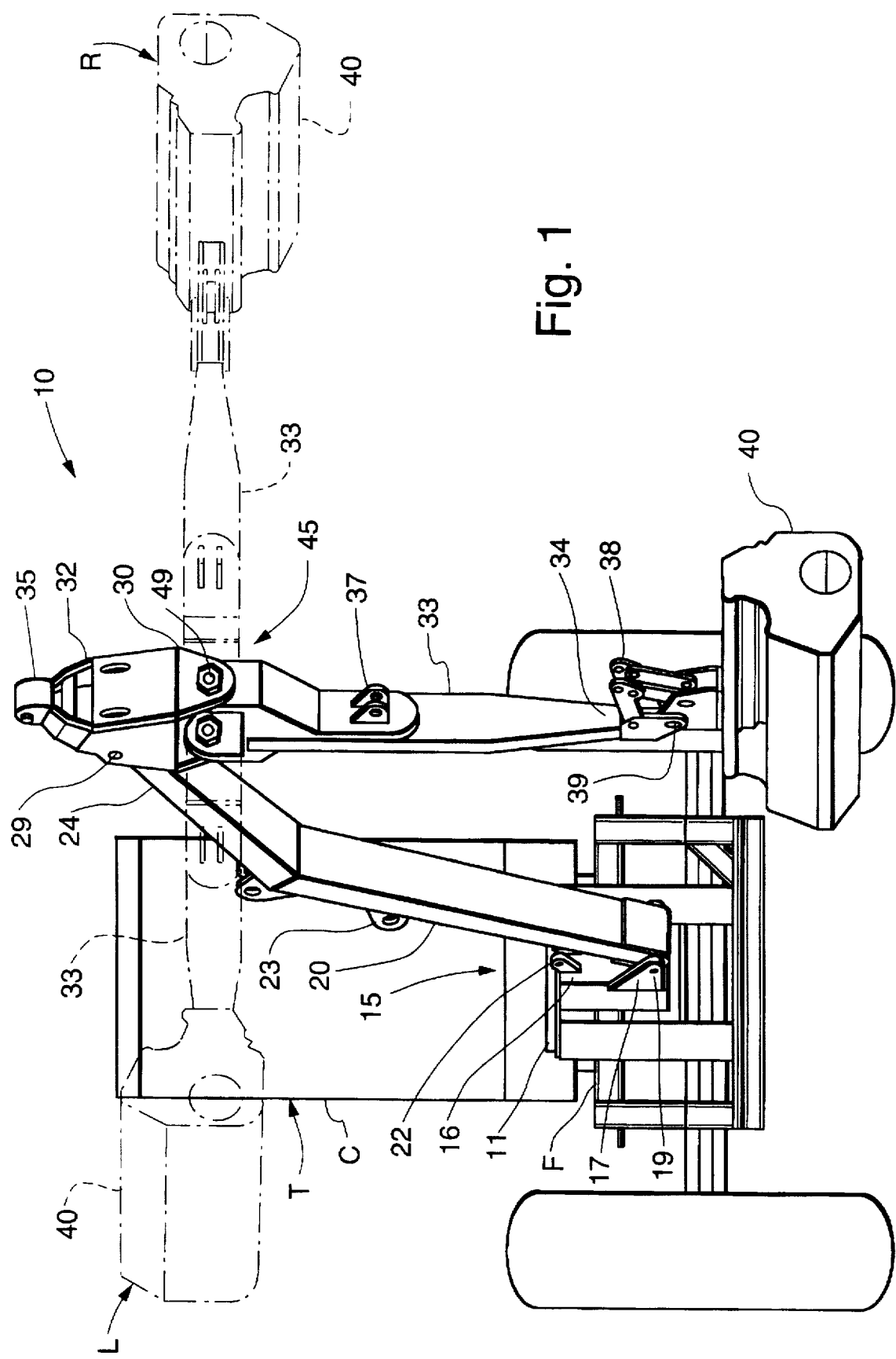
FIG. 1 is an elevational view of a prime mover having the articulated boom assembly incorporating the principles of the instant invention mounted on the rear portion thereof, the cutting head mounted on the distal end of the boom assembly being positioned adjacent the ground rearwardly of the prime mover, the range of articulated movement of the second boom member about the hydraulic rotary actuator being shown in phantom, the hydraulic actuating cylinders have been removed for purposes of clarity.
Figure 2:
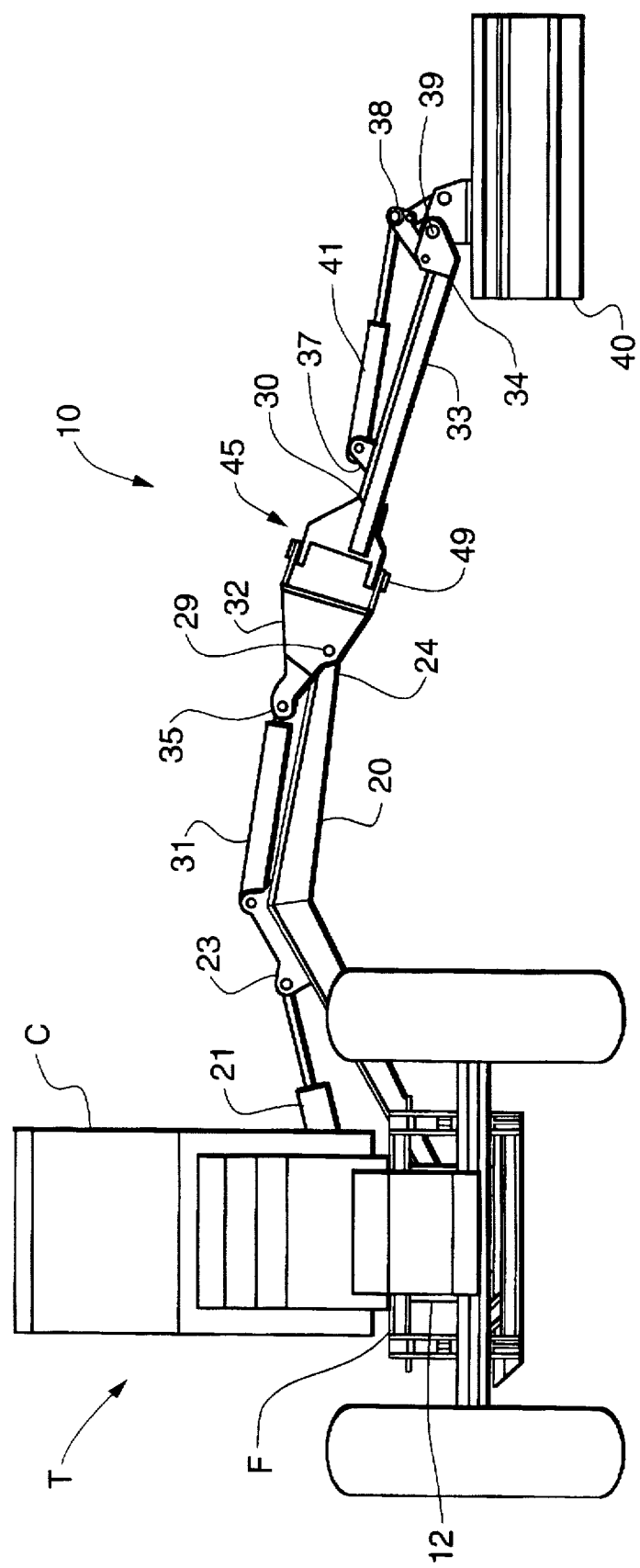
FIG. 2 is an opposing elevational view of the prime mover as shown in FIG. 1 with the articulated boom assembly extended substantially fully laterally of the prime mover with the cutting head positioned adjacent the ground laterally of the prime mover.
Figure 3:
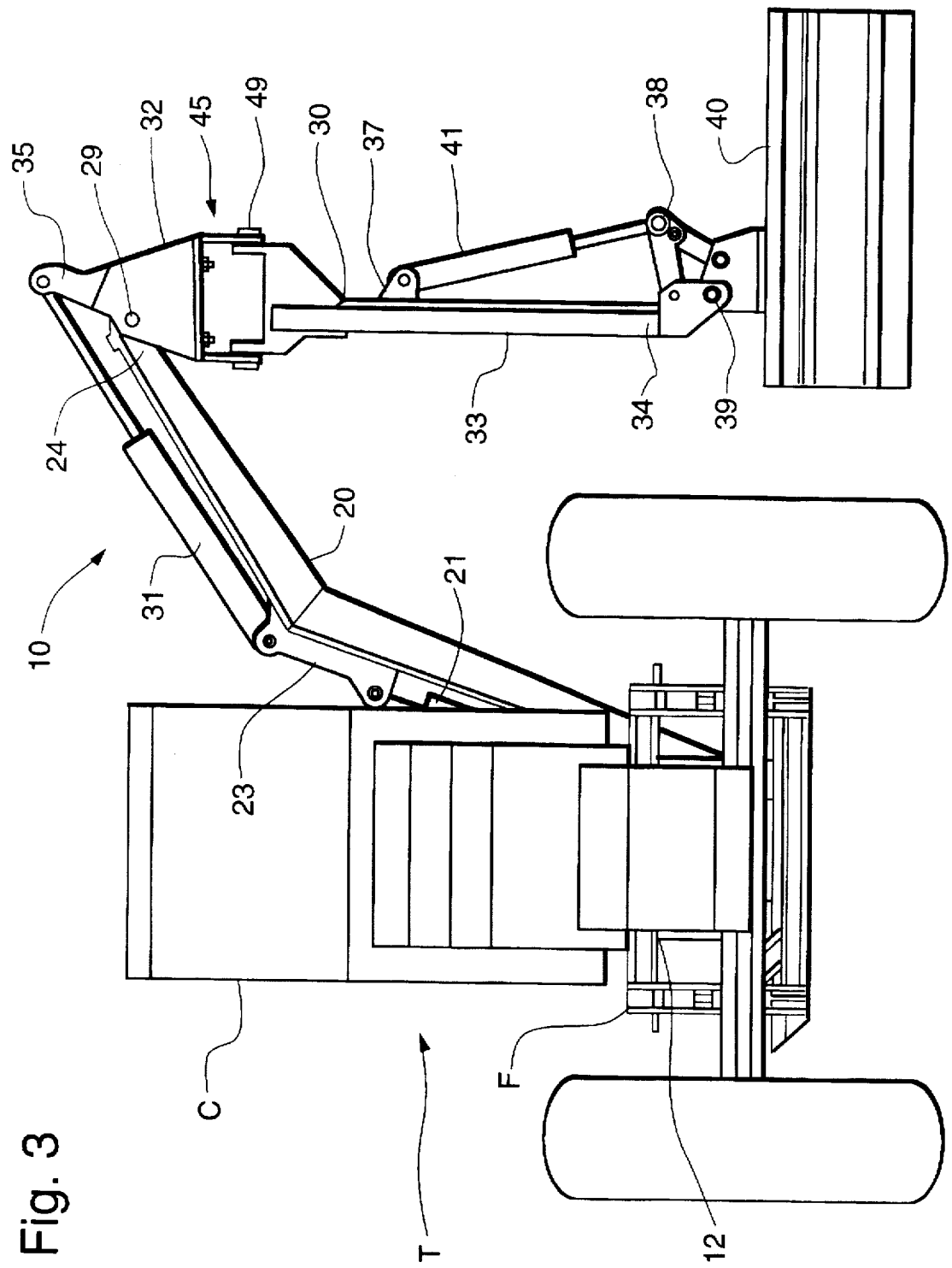
FIG. 3 is an elevational view of the prime mover as shown in FIG. 2 with the articulated boom assembly somewhat collapsed to position the cutting head adjacent the ground close to the prime mover, the second boom member being oriented substantially vertically.

Referring now to the drawings and, particularly, to FIGS. 1 and 2, the articulated boom assembly incorporating the principles of the instant invention can best be seen mounted to the end of a prime mover in the configuration of a brush cutting apparatus. Any left and right references are used as a matter of convenience and are determined by standing rearward of the prime mover facing forwardly at the articulated boom assembly and into the normal direction of travel.

In FIG. 1, one skilled in the art will recognize an articulated boom assembly 10 having a pair of boom members 20, 30 pivotally connected for movement in a generally vertical plane in a conventional manner. The boom assembly 10 is supported from a fixed frame member 12 that is detachably secured to the frame F of a prime mover, such as a tractor T, so as to be fixed relative thereto. The prime mover T provides operative power for manipulating the boom assembly 10 and the work implement 40, such as a brush cutting flail head, mounted on the distal end 34 thereof, as well as mobilely transporting the boom assembly 10 over the ground.

The fixed frame member 12 carries a pivot assembly 15 to which the boom assembly 10 is attached to define a generally vertically oriented pivot axis 16 and to provide for a range of horizontal movement of the boom assembly 10. The pivotal movement of the boom assembly 10 about the pivot axis 16 is well known in the art and is accomplished hydraulically, powered by the prime mover T. The range of horizontal movement of the boom assembly 10 about the pivot axis 16 is limited by the structure of the prime mover T to a range of approximately 180 degrees, allowing the work implement 40 to be positioned on either side of the prime mover T. The pivot assembly 15 also includes a mounting bracket 17 for movement about the vertical pivot axis 16 and carries therewith a first generally horizontal pivot 19.

The boom assembly 10 includes a first boom member 20 pivotally connected to the mounting bracket 17 by the first horizontal pivot 19 such that the first boom member 20 is movable in a generally vertical plane throughout the horizontal range of motion thereof about the pivot axis 15. The vertical movement of the first boom member 20 is effected by a first hydraulic actuating cylinder 21 interconnecting a first attachment bracket 22 on the pivot assembly 15 and a second attachment bracket 23 on the first boom member 20 so that extension and contraction of the hydraulic cylinder 21 will effect pivotal movement of the first boom member 20 about the first horizontal pivot 19. The distal end 24 of the first boom member 20 carries a second horizontal pivot 29 generally parallel to the first horizontal pivot 19.

The second boom member 30 is pivotally connected to the distal end 24 of the first boom member 20 by the second horizontal pivot 29. The second boom member 30 is pivotally movable through manipulation of a second hydraulic actuating cylinder 31 interconnecting the second attachment bracket 23 and an actuating arm 35 forming part of the second boom member 30 and providing a mechanical advantage relative to the second horizontal pivot axis 29. Accordingly, as is known in the art, the second boom member 30 is generally vertically movable in the same plane as the movement of the first boom member 20 throughout the horizontal range of movement of the boom assembly 10 about the vertical pivot 15.

The work implement 40 is pivotally mounted to the distal end 34 of the second boom member 30 for movement about a third horizontally disposed pivot 39 such that the work implement 40 is pivotally movable within the same plane of movement as the first and second boom members 20, 30. This pivotal movement of the work implement 40 is controlled through actuation of a third hydraulic actuator cylinder 41 anchored on the third attachment bracket 37 fixed to the second boom member 30 and connected to the fourth attachment bracket 38 attached to the work implement 40.

By appropriate manipulation of the first, second and third hydraulic actuator cylinders 21, 31 and 41, the work implement 40 can be positioned at a desired distance away from the vertical pivot assembly 15, while keeping the work implement 40 in a operative orientation generally parallel to the ground. Furthermore, appropriate manipulation of the vertical pivot assembly 15 to rotate the boom assembly 10 about the vertical pivot axis 16 through its range of motion will permit the work implement 40 to be positioned substantially anywhere within the range of motion for operation.

Referring now to FIGS. 1 and 4–6, it can be seen that the second boom member 30 has incorporated therein a hydraulic rotary actuator 45 connectable to the hydraulic system of the prime mover T for powering the operation thereof. The hydraulic rotary actuator 45 is preferably of the type manufactured by Helac Corporation, Model HP-60KS-SD-L180-H, helical pivot hydraulic rotary actuator. This hydraulic rotary actuator 45 includes a fixed portion 46 mountable with a fixed portion 32 of the second boom member 30 and a rotatable pivot portion 47 connected to the remote rotating portion 33 of the second boom member 30. As a result, the rotating portion 33 of the second boom member 30 is pivotally rotatable about a orthogonal pivot axis 49 defined by the rotary actuator 45.

Figure 4:
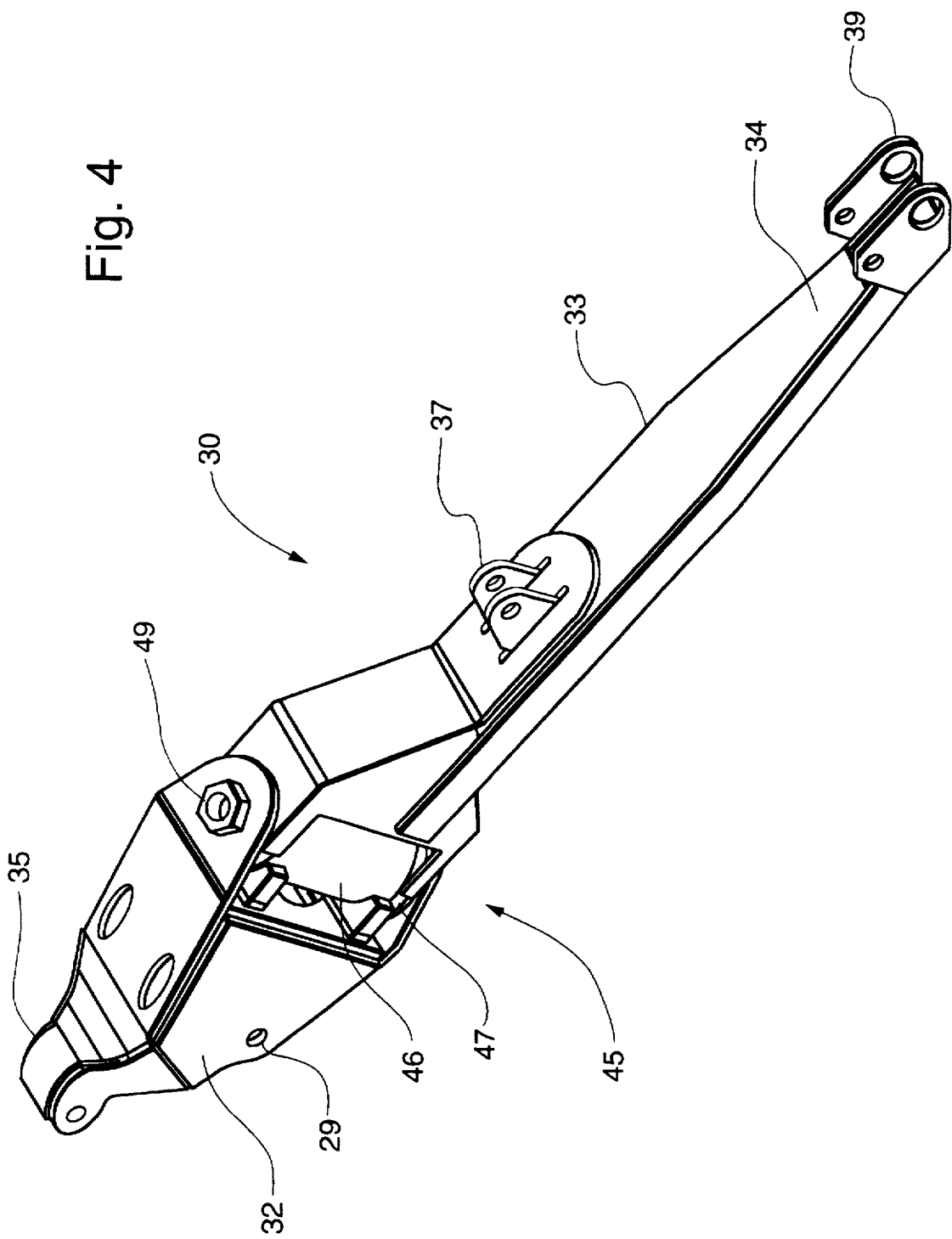
FIG. 4 is an enlarged perspective detail view of the second boom member incorporating the hydraulic rotary actuator with the second boom member being oriented in alignment with the first boom member to which the second boom member would normally to pivotally coupled.
Figure 5:
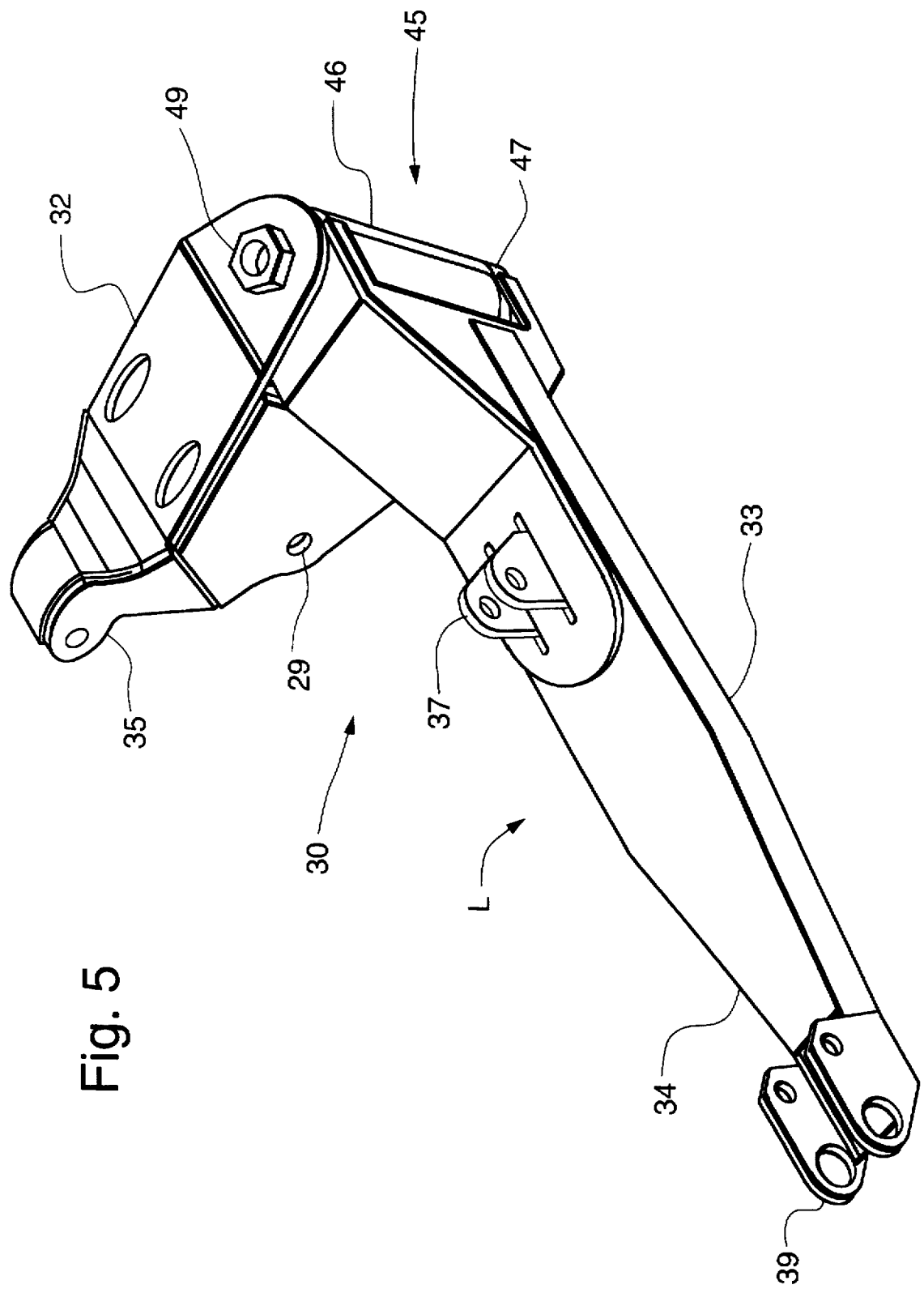
FIG. 5 is an enlarged perspective detail view of the second boom member as shown in FIG. 4, but with the hydraulic rotary actuator being manipulated to move the cutting head that would be attached to the distal end of the second boom member in a clockwise motion, when viewed from above, relative to the orientation depicted in FIG. 4.
Figure 6:
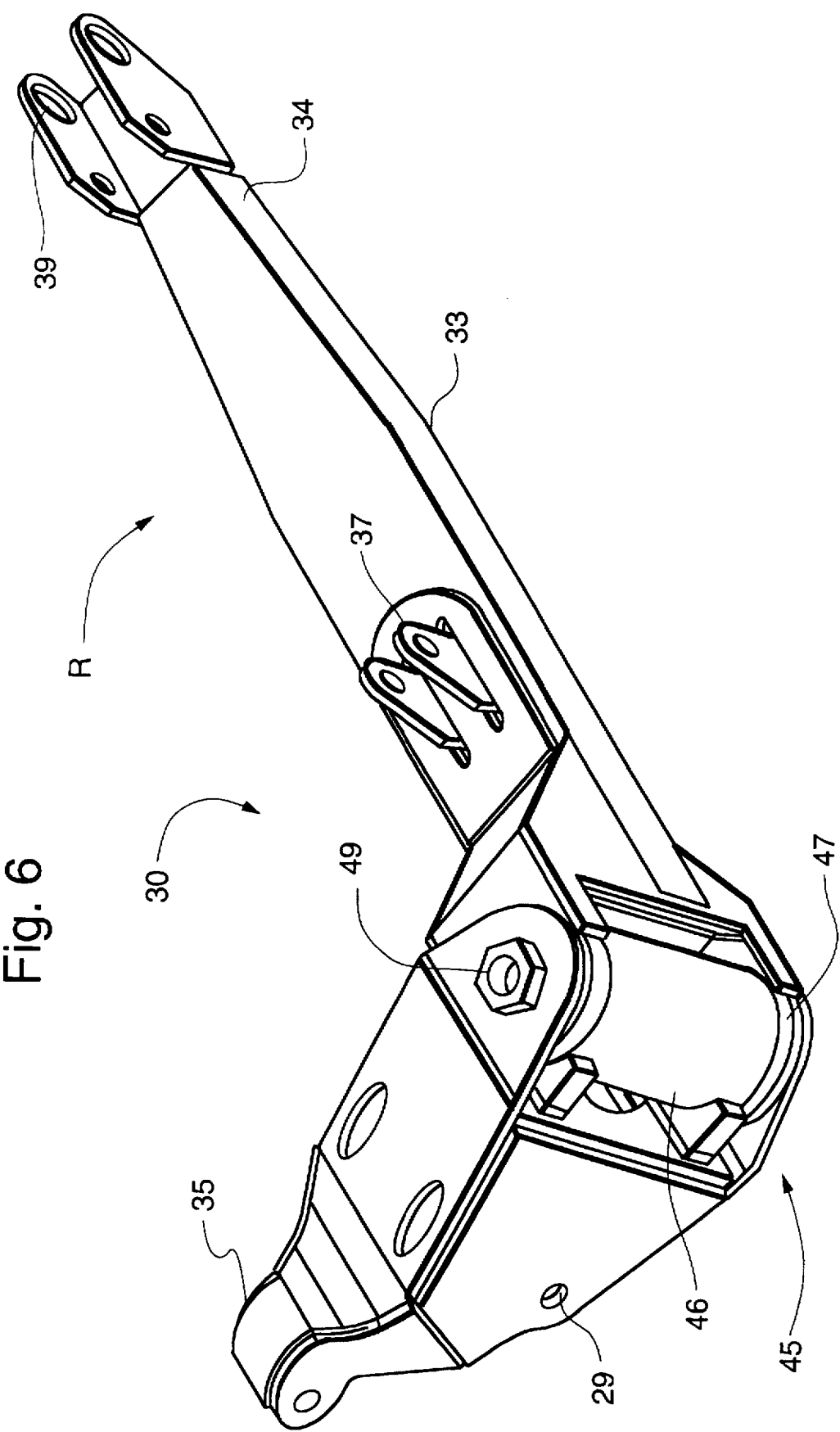
FIG. 6 is an enlarged perspective detail view of the second boom member as shown in FIG. 4, but with the hydraulic rotary actuator being manipulated to move the cutting head that would be attached to the distal end of the second boom member in a counter-clockwise motion, when viewed from above, relative to the orientation depicted in FIG. 4.

As best seen in FIGS. 5 and 6, the rotating portion 33 of the second boom member 30 is pivotable through an arc of approximately 180 degrees from a 90 degree left rotation shown in FIG. 5 to a 90 degree right rotation depicted in FIG. 6, including a normal straight position shown in FIG. 4 aligned with the first and second boom members 20, 30. The work implement 40 mounted on the distal end 34 of the second boom member 30 is also pivotally movable with the rotating portion 33 of the second boom member 30, such that a side to side swinging motion between the extreme positions shown in FIGS. 5 and 6 results in a scything action for the work implement 40.

Figure 7:
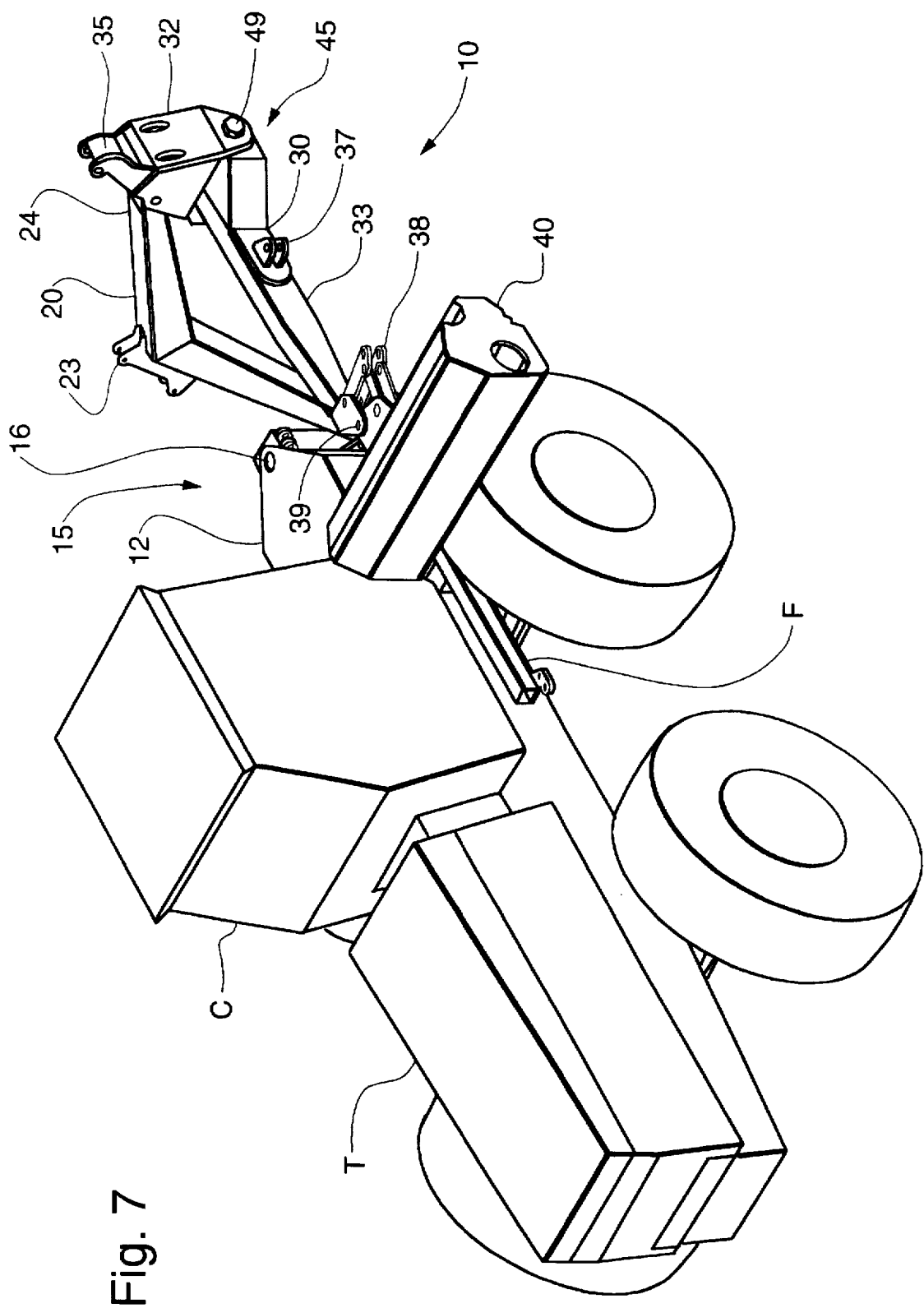
FIG. 7 is a perspective view of a prime mover having the articulated boom assembly mounted on the rear portion thereof with the cutting head mounted on the distal end thereof being located in a raised position laterally of the operator's cab, the orientation of the second boom member being substantially vertical.

Manipulating the rotational movement of the work implement 40 about the orthogonal pivot axis 49, in combination with the other pivotal movements of the boom assembly 10 described above, the ability to place the work implement 40 in a desired working or operative position takes on additional flexibility. For example, the work implement 40 can be positioned forwardly along the side of the operator's cab C of the prime mover T for better viewing by the operator, as shown in FIG. 7 by manipulating the second hydraulic cylinder 31 to orient the second boom member 30 in a generally vertical position and then rotating the rotary actuator 45 to the extreme left position depicted in FIG. 5.

Figure 8:
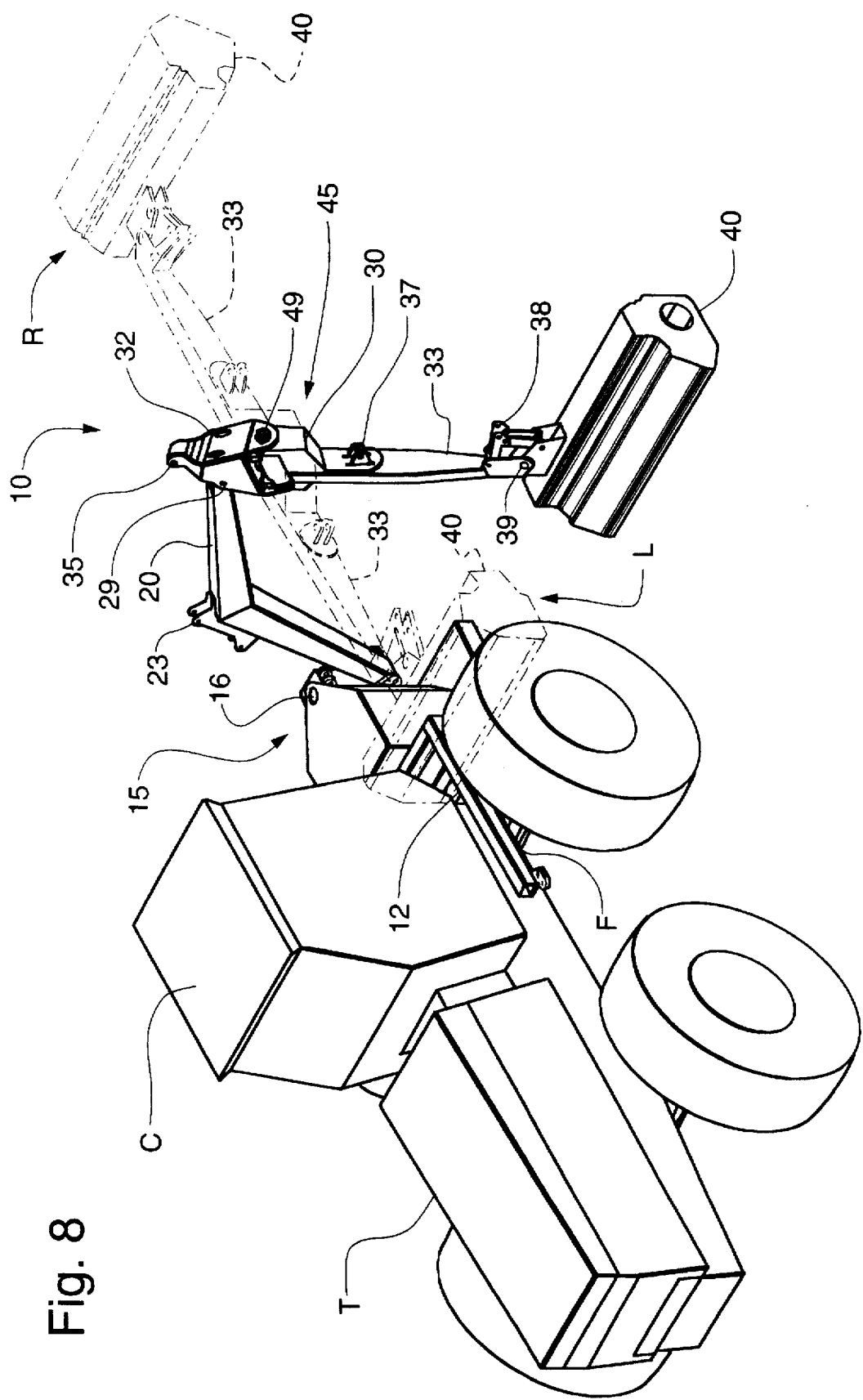
FIG. 8 is a perspective view of a prime mover as shown in FIG. 7 with the cutting head lowered to the ground adjacent to and rearwardly of the prime mover, the range of motion available through manipulation of the hydraulic rotary actuator being shown in phantom.

The range of motion effected by the hydraulic rotary actuator 45 when in the orientation described above with respect to FIG. 7 can best be seen in FIG. 8 in phantom. The work implement 40 can be positioned in the traditional outboard, parallel with the ground, position shown in solid lines in FIG. 8 simply by operating the first, second and third hydraulic cylinders 21, 31 and 41 in the manner described above. The subsequent manipulation of the hydraulic rotary actuator 45 provides the range of motion shown in phantom in FIG. 8, which allows the operator to obtain a greater range of motion for the work implement 40 to reach heretofore unknown positions.

Orienting the second boom member 30 in a generally horizontal orientation as shown in FIG. 9 allows the pivotal motion of the work implement 40 about the orthogonal pivot axis 49 to sweep in a generally horizontal plane, as shown in phantom in FIG. 9. One skilled in the art will readily recognize that a manipulation of the first and second hydraulic actuator cylinders 21 and 31 to keep the orthogonal pivot axis 49 perpendicular to the slope of the ground will allow the rotational motion induced by the hydraulic rotary actuator 45 to keep the work implement 40 generally parallel to the ground, although some manipulation of the third hydraulic cylinder 41 may be necessary to maintain the work implement 40 parallel to the ground.

This sweeping motion effected by manipulation of the hydraulic rotary actuator 45 with the orthogonal pivot axis maintained generally perpendicular to the ground can be referred to as a scything motion. Constant manipulation, even automatic control, of the rotary actuator 45 enables the work implement to operate over a larger area of ground for each pass of the prime mover T than if a traditional boom assembly 10 were provided. One skilled in the art will recognize that the movement of the work implement 40 between the straight extended position shown in solid lines in FIG. 9 and the extreme left position L shown in phantom adjacent the operator's cab C in FIG. 9 is adequate to obtain the scything motion.

Some prime movers T are operable forward or backward; therefore, the movement of the work implement 40 between the straight extended position shown in solid lines in FIG. 9 to the extreme right position R will best obtain the greatest amount of coverage of the work implement 40. Since the boom assembly 10 is pivotable about the vertical pivot axis 16 to opposing sides of the prime mover T, the extreme left and right positions L, R operate conversely on the opposing side of the tractor to provide the aforementioned scything motion in both the forward and rearward directions.

Although the operation of the work implement 40 as described above provide advantages over the prior art, it is also anticipated that the instant invention will be operated in substantially the same way as prior art devices, which is that the work implement 40 is set into an orientation relative to the ground and simply moved along in a linear path with the movement of the prime mover T. In this type of operation, as well as the type of improved operation of the work implement 40 described above, the instant invention provides a distinct advantage in that the hydraulic rotary actuator 45 provides a bidirectional breakaway mechanism for the work implement 40.

In known prior art mechanisms, the work implement 40 is intended to operate only to a pre-selected side of the prime mover T and a breakaway mechanism, typically a mechanical device, allows the work implement 40 to move away from an object, such as a post or tree, encountered during operation to prevent damage to the structure of the work implement 40 or the boom assembly 10. No known prior art mechanism provides a breakaway mechanism for the work implement 40 on both sides of the prime mover T. The utilization of the hydraulic rotary actuator 45 to provide an orthogonal pivot axis 49 creates a bidirectional breakaway mechanism for the work implement 40 that is operable irrespective of the side of the prime mover T on which the work implement 40 is disposed.

The hydraulic rotary actuator 45 incorporates a relief valve that is adjustable in pressure setting. By setting the relief valve appropriately, the hydraulic pressure that sets the rotary actuator 45 at the desired orientation to appropriately dispose the work implement 40 relative to the ground will increase beyond the relief setting whenever the work implement 40 strikes or impacts an object. By passing the hydraulic fluid over the relief valve, the rotary actuator 45 will permit rotation of the work implement 40 about the orthogonal axis 49 to effectively create a breakaway mechanism allowing the work implement 40 to move rearwardly relative to the forward direction of travel of the prime mover T. Once the object is cleared, the rotary actuator 45 can be re-positioned to orient the work implement 40 as desired for continued operation.

One skilled in the art will readily realize that the hydraulic rotary actuator 45 will be able to provide a breakaway relief for the work implement 40 no matter on which side of the prime mover T the work implement 40 is positioned to operate, so long as the rotary actuator 45 is not positioned near or at its operational limits when the work implement 40 is oriented relative to the ground for operation. Furthermore, the breakaway aspects of the rotary actuator 45 would be effective even when the work implement 40 is operating in the aforementioned scything motion.

One skilled in the art will readily recognize the advantages of an articulated boom assembly 10 constructed according to the principles of the instant invention in the operation of a brush cutting or other similar mowing and cutting apparatus. It will be understood, however, that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific form shown.

Having thus described the invention, what is claimed is:

1. In a boom apparatus having a first boom member mounted for rotational movement about a generally vertical pivot axis and for pivotal movement about a first generally horizontal pivot axis; a second boom assembly pivotally connected to said first boom member for pivotal movement about a second generally horizontal pivot axis, said second boom assembly including a second boom member and being movable with said first boom member about said first horizontal pivot axis and said generally vertical pivot axis; and a work implement supported from a distal end of said second boom assembly, said work implement being pivotally movable within a first plane of movement defined by said first and second boom members through movement thereof about said first and second generally horizontal pivot axes, the improvement comprising:

said second boom assembly being articulated about a generally orthogonal pivot axis to permit movement therewith in said first plane of movement extending generally orthogonal to said first plane of movement.

2. The boom apparatus of claim 1 wherein said generally orthogonal pivot axis divides said second boom assembly into a fixed portion and a rotating portion, said fixed portion supporting said generally orthogonal pivot axis for movement therewith in said first plane of movement, said rotating portion being pivotally supported from said generally orthogonal pivot axis to be movable within said second plane of movement, said work implement being movable within both said first and second planes of movement.

3. The boom apparatus of claim 2 wherein the orientation of said second plane of movement relative to said first plane of movement is dependent upon the pivotal movement of said generally orthogonal pivot axis about at least one of said first and second generally horizontal pivot axes.

4. The boom apparatus of claim 3 wherein said second plane of movement is selectively positionable to maintain said work implement generally parallel to the ground when moving within said second plane of movement.

5. The boom apparatus of claim 4 wherein said generally orthogonal pivot axis limits the movement of said work implement to approximately 180 degrees of rotation within said second plane of movement.

6. The boom apparatus of claim 5 wherein said work implement is pivotally supported by a third pivot axis carried by said distal end of said second boom assembly, said third pivot axis being positionable in a generally horizontal orientation parallel to said first and second generally horizontal pivot axes.

7. The boom apparatus of claim 6 wherein said second boom member carries said orthogonal pivot axis and includes said fixed portion being pivotally connected to said first boom member by said second generally horizontal pivot, and further includes said rotating portion having said third pivot axis located at said distal end for pivotally mounting and work implement.

8. The boom apparatus of claim 7 wherein said generally orthogonal pivot axis is defined by a hydraulic rotary actuator interconnecting said fixed portion of said second boom member and said rotating portion of said second boom member.

9. The boom apparatus of claim 8 wherein work implement is a flail-type brush cutter movable in a scything action through manipulation of said hydraulic rotary actuator, the pivotal movements of said first and second boom members about said first and second generally horizontal pivot axes being controlled through manipulation of first and second hydraulic cylinders, respectively.

10. The boom apparatus of claim 9 further comprising a fixed frame member selectively mountable to a prime mover, said fixed frame member carrying said generally vertical pivot axis and supporting said first and second boom members for rotation about said generally vertical pivot axis.

11. An apparatus mountable to a prime mover movable in a forward direction of travel, comprising:

a fixed frame member selectively connectable to the prime mover and including a generally vertical pivot axis carried by said fixed frame member;

a first boom member mounted for movement in a generally horizontal plane about said generally vertical pivot axis to a position on opposing sides of said prime mover, said first boom member being pivotally supported from a first generally horizontal pivot axis for further movement of said first boom member in a generally vertical plane passing through said generally vertical pivot axis, said first boom member having a distal end carrying a second generally horizontal pivot axis;

a second boom member pivotally connected at said distal end of said first boom member by said second generally horizontal pivot axis for movement in said generally vertical plane, said second boom member including:
  a fixed portion having a first end pivotally connected to said second horizontal pivot axis and a remote second end;
  a rotary member defining a generally orthogonal pivot and being carried by said fixed portion at said remote second end; and
  a rotating portion connected to said rotary member and being rotatable about said generally orthogonal pivot in an orthogonal plane oriented substantially perpendicular to said generally vertical plane, said rotating portion having a remote end spaced away from said generally orthogonal pivot; and a work implement pivotally connected about a third pivot carried by said remote end of the rotating portion of said second boom member, said rotary member providing a breakaway mechanism permitting movement of said work implement away from said forward direction of travel irrespective of the side of said prime mover on which said work implement is positioned.

12. The apparatus of claim 11 wherein said rotary member comprises a hydraulic rotary actuator, said work implement being movable within said orthogonal plane through manipulation of said rotary actuator.

13. The apparatus of claim 12 wherein said orthogonal plane is variably positionable between a substantially horizontal orientation and a substantially vertical orientation through a selective orientation of said generally orthogonal pivot within said generally vertical plane about said first and second generally horizontal pivot axes.

14. The apparatus of claim 13 wherein said hydraulic rotary actuator incorporates a relief valve, said work implement being movable away from said direction of travel when impacting an object as the hydraulic pressure passes over the relief valve.

15. A boom-mounted cutting apparatus, comprising:

a fixed frame member selectively connectable to a prime mover and supporting a substantially vertical pivot;

a boom assembly having a first end pivotally connected to said fixed frame member by a first horizontal pivot permitting said boom apparatus to move in a vertical plane and a distal second end, said first horizontal pivot being mounted on said fixed frame member for rotation in a generally horizontal plane about said vertical pivot, said boom assembly including:
  a first boom member pivotally connected to said first horizontal pivot and having a remote end carrying a second horizontal pivot;
  a second boom member pivotally connected at said remote end of said first boom member by said second horizontal pivot for movement in said vertical plane, said second boom member defining said distal end of said boom assembly; and
  an orthogonal pivot carried by said second boom member; and a cutting implement pivotally connected to said boom assembly by a third pivot carried by said distal end of said boom assembly, said cutting implement being movable generally vertically through movement thereof about said first and second horizontal pivots and being further movable in an orthogonal plane about said orthogonal pivot.

16. The boom-mounted cutting apparatus of claim 15 wherein said second boom member includes a fixed portion having a first end pivotally connected to said second horizontal pivot and a remote second end supporting said orthogonal pivot; and a rotating portion connected to said orthogonal pivot and being rotatable about said orthogonal pivot in said orthogonal plane oriented substantially perpendicular to said vertical plane, said cutting implement being mounted on said rotating portion.

17. The boom-mounted cutting apparatus of claim 16 wherein said orthogonal plane is variably positionable between a substantially horizontal orientation and a substantially vertical orientation through a selective positioning of said generally orthogonal pivot within said generally vertical plane about said first and second generally horizontal pivot axes.

18. The boom-mounted cutting apparatus of claim 17 wherein said cutting implement can be moved through a scything motion maintained substantially parallel to the ground by the selective positioning of said orthogonal pivot, through manipulation of said first and second boom members about said first and second generally horizontal pivot axes, to be oriented substantially perpendicular to the surface of the ground.

19. The boom-mounted cutting apparatus of claim 17 wherein said cutting implement is movable about said orthogonal pivot through a range of motion of approximately 180 degrees, said cutting implement being position able on opposing sides of said prime mover through rotational movement about said vertical axis.

20. The boom-mounted cutting apparatus of claim 19 wherein said orthogonal pivot provides a breakaway mechanism for said cutting implement irrespective to which side of said prime mover said cutting implement is disposed.

* * * * *